June 19, 1923.
L. D. WILLIAMS ET AL
1,459,127
METHOD OF DETERMINING THE COMPOSITION OF GASES
Filed Sept. 28, 1920
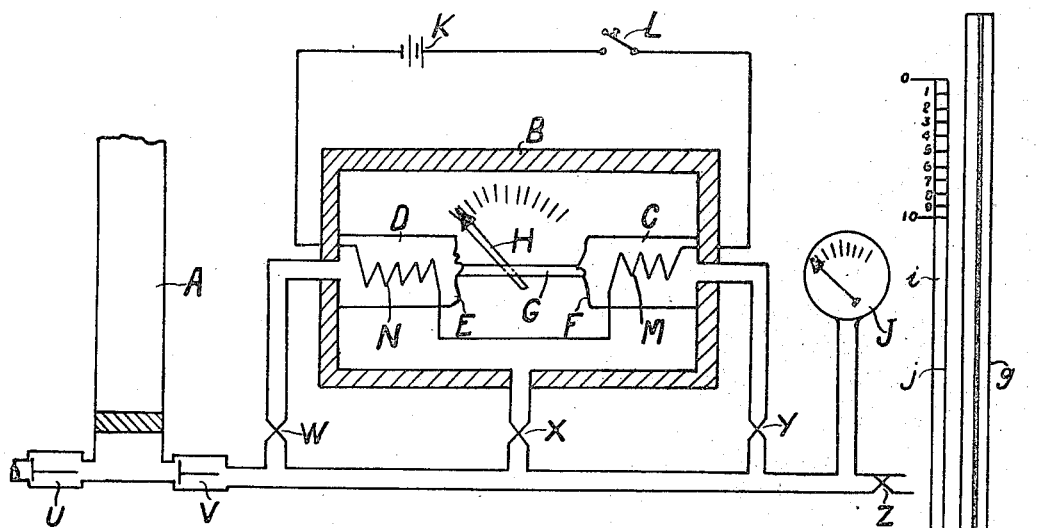
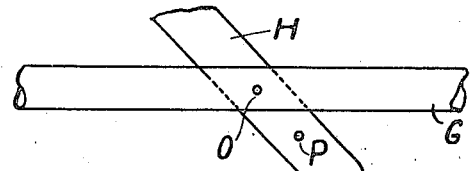
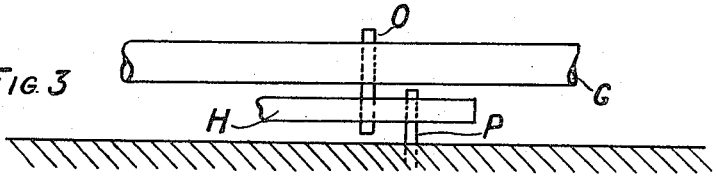
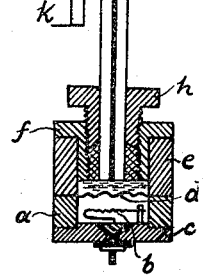
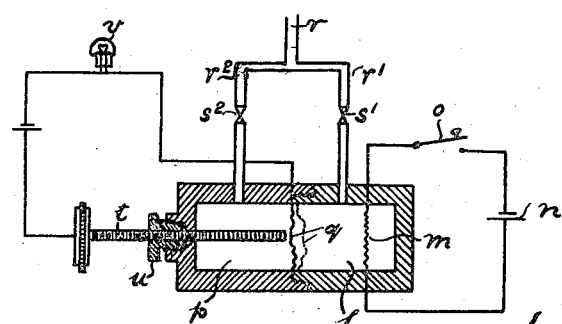
Inventors
Leo D. Williams
and Alfred Williams
By Knight Bros
Attys Patented June 19, 1923.

1,459,127

UNITED STATES PATENT OFFICE.

LEO DAFT WILLIAMS AND ALFRED WILLIAMS, OF LONDON, ENGLAND.

METHOD OF DETERMINING THE COMPOSITION OF GASES.

Application filed September 28, 1920. Serial No. 413,322.

*To all whom it may concern:*

Be it known that we, LEO DAFT WILLIAMS and ALFRED WILLIAMS, citizens of the United States of America, and residents of No. 16 Hauteville Court, Stamford Brook, London, W. 6, England, have invented certain new and useful Improvements in Methods of Determining the Composition of Gases, of which the following is a specification.

This invention relates to an improved method of and means for estimating the composition of gases by measuring the diminution in pressure or the contraction in volume which occurs on combination or absorption of any constituent thereof.

This new method of estimating certain gas mixtures is an improvement of the usual laboratory method which consists in measuring the contraction which occurs on combination or absorption of a constituent of the mixture.

In all methods of the above type, three factors enter namely the pressure, P, the volume, V, and the absolute temperature, T. For any sample $\frac{PV}{T} = $ a constant, but, when combination or absorption takes place, this constant alters in proportion to the change occurring. It is usual, when carrying out estimations by the above method, to permit either the pressure or the volume to alter, and to keep the temperature and the other factor approximately constant. Then the change occurring is measured by noting the alternation of the uncontrolled factor.

According to our invention a sample of the gas mixture to be estimated is compressed to a pressure substantially above atmospheric pressure before combination or absorption is started. Except for the changes introduced by the compression, the procedure is the same as in the usual laboratory method.

One advantage of the initial compression is that it reduces or removes any error arising from the use of samples not saturated with moisture, because compression reduces the amount of water required to saturate a given sample of gas.

Another advantage is that, in a chamber of a given size, larger samples may be tested, thus producing a force to measure which is larger than is obtained when operating at atmospheric pressure.

As the saturation of a gas with aqueous vapour depends on the volume and temperature of the gas and is not directly dependent on the pressure thereof, by sufficiently initially compressing the gas prior to the combustion stage of the estimation process, a gas which at atmosphereic pressure is unsaturated, will by the diminution of its volume, become practically saturated, and consequently will not take up the water resulting from the combustion, whilst it remains compressed.

Further, with a compressed gas the change of pressure resulting from the combustion can be compared with an atmosphere at the initial compression pressure, which will give a far larger reading on the gauge, (being a reading of the difference of the two relatively high pressures) than a reading of the absolute drop in pressure.

The invention therefore consists in initially compressing a gas, prior to the combustion or absorption stage of a content estimation process by combustion or absorption, to a degree such that the forces to be measured are appreciably increased and errors due to non-saturation are rendered negligible.

An apparatus for carrying out the invention is shown diagrammatically on the accompanying drawings in which:—

Fig. 1 is a diagram illustrating the whole apparatus.

Fig. 2 is an enlarged elevation and Fig. 3 a plan of a detail thereof.

Fig. 4 is a sectional elevation of an instrument embodying an improved construction of pressure gauge.

Fig. 5 is a sectional elevation of a volumetric measuring apparatus.

Referring to Figs. 1, 2 and 3, A is a pump fitted with two non-return valves U and V. B is a pressure chamber containing a combustion chamber, C, a compensating chamber D, and the moving parts which comprise diaphragms E and F, their interconnecting rod G and a pointer H. The three chambers communicate with the pump through the three valves, W, X and Y. J is a pressure gauge marked with a standard pressure for which the apparatus is calibrated. Z is an exhaust valve. The heater circuit contains the battery K, switch L and heaters M and N, one of which, N, is a platinum wire, and the other, M, a gold plated platinum wire. The pin O (Figs. 2 and 3) is secured in the rod G and turns in the pointer H, whilst the pin P turns in the case and is secured to the pointer H.

To use the apparatus, the gas to be estimated is drawn in past the valve U and pumped into the chambers B C and D until the gauge J records the standard pressure. Then the valves W, X and Y are closed and the heater switch L held closed until the pointer comes to rest, when the reading of the pointer is taken. The instrument is resent by opening the valves W, X and Y, opening the exhaust valve Z and finally closing this latter valve.

The main function of the compensating chamber C and compensating heater M is to balance by a similar action the immediate and temporary increase in pressure due to the local heating of the gas in the space surrounded by the coil of the catalytic heater N, so enabling a reading to be taken whilst the heater N is in action. However, if the reading be taken after the apparatus has cooled, the compensating chamber C and compensating heater M can be dispensed with.

Assuming the compensating chamber C to be dispensed with, as the gauge comprising the diaphragm E and pointer H is located in the chamber B which contains an atmosphere of the gas at the initially produced high pressure, the reading of the pointer shows the difference of pressure produced between the chambers B and D, which gives a reading of far greater range than were the reading taken of the actual pressure in the chamber D. Assuming the chamber C to be provided, the difference in pressure between the chambers C and D is indicated, irrespective of the pressure in the chamber B, which however is preferably kept high to avoid rupture of or leakage from the chambers C and D.

However with a sufficiently sensitive gauge giving a large range of indication, a direct reading of the drop in pressure can be taken. Fig. 4 shows a gauge devised for this purpose. It consists of a metal chamber $a$ containing a catalytic heater $b$. The chamber $a$ for instance is formed in brass and is closed at the bottom by a brass base plate $c$ and at the top by a metal diaphragm $d$. Above the diaphragm the brass chamber $a$ is prolonged by a similar block $e$ of higher expanding material, such as zinc or vulcanite, fitted with a brass or equivalent plug $f$ in which a fine bore glass tube $g$ is held by a gland $h$. The otherwise unoccupied space above the diaphragm $d$ is filled with water, coloured for instance with Congo red, which also ascends the tube $g$.

The parts $a$, $c$, $d$, $e$ and the flange of $f$ are held together by bolts and spring washers (not shown) in such a manner as to permit expansion.

An inlet and outlet (not shown) are provided to the chamber $a$ for introducing the gas under pressure.

The initial pressure of the gas acting through the diaphragm $d$ drives the water up the tube $g$ where its position can be noted by a suitably calibrated scale $i$. The fall in pressure on combustion will cause a descent of considerable range of the water in the tube $g$, so that direct readings of the pressure can easily be taken with this gauge.

For example, with the scale shown, the range 0-10 corresponds to 10% of methane, with 0 (zero) indicating an absolute pressure of 50 lbs. per square inch, the arrow $j$ atmospheric pressure and the link $k$ a complete vacuum.

The construction of the body of the gauge in differentially expanding materials is for the purpose of compensating the gauge for changes in the room or atmospheric temperature, by varying the liquid space to compensate for the thermometric action of the water.

Fig. 5 shows an apparatus for reading a change of volume of the gas under estimation. Here $l$ is a chamber containing a catalytic heater $m$, the circuit of which includes the battery $n$ and key $o$. $p$ is a second chamber separated from the chamber $l$ by an easily yielding diaphragm $q$. Compressed gas is admitted to both chambers $l$ and $p$ from a pipe $r$ by branches $r^1$, $r^2$, controlled by stop valves $s^1$, $s^2$. $t$ is a screw passing through a gland $u$ into the chamber $p$. After combustion has taken place in the chamber $l$, the screw $t$ is turned until it makes contact with the diaphragm $q$, which will then have bulged into the chamber $l$ owing to the contraction in volume of the gas therein. On the screw $t$ making contact with the diaphragm $q$, the circuit of a lamp $v$ and battery $w$ is closed, indicating that the end of the screw has reached the diaphragm. By suitable calibration, the intrusion of the screw $t$ will measure the contraction in volume of the gas in the chamber $l$.

In all the above described apparatus the metal parts are massive or water-cooled, to keep the temperature within a small range.

Instead of a hot wire catalyzer, a cold catalyst such as platinum sponge may be employed. For a process involving the estimation of carbon dioxide, caustic soda or other absorbent can be used, which is mentioned as an example to show that the invention is not limited to processes involving combustion.

Claims.

1. Method of estimating the content of a gas by measuring a permanent stoichiometric alteration of the $\frac{PV}{T}$ value of a compressed sample in a sealed chamber, the initial gas pressure being such that the forces to be measured are appreciably increased and errors due to non-saturation with moisture are rendered negligible.

2. An estimation method according to claim 1, in which the contraction of the gas on permanent stoichiometric alteration is measured relatively to an equally compressed atmosphere in a sealed chamber.

3. An estimation method according to claim 1 in which the difference of pressure is measured by a gauge enclosed in an atmosphere at the initial compression pressure.

LEO DAFT WILLIAMS.
ALFRED WILLIAMS.